3,221,866
COMBINATION CONVEYER SYSTEM
Ralph Nash, Highland Park, Ill., assignor to Allis-Chalmers Manufacturing Company, Milwaukee, Wis.
Filed Oct. 22, 1964, Ser. No. 405,736
4 Claims. (Cl. 198—177)

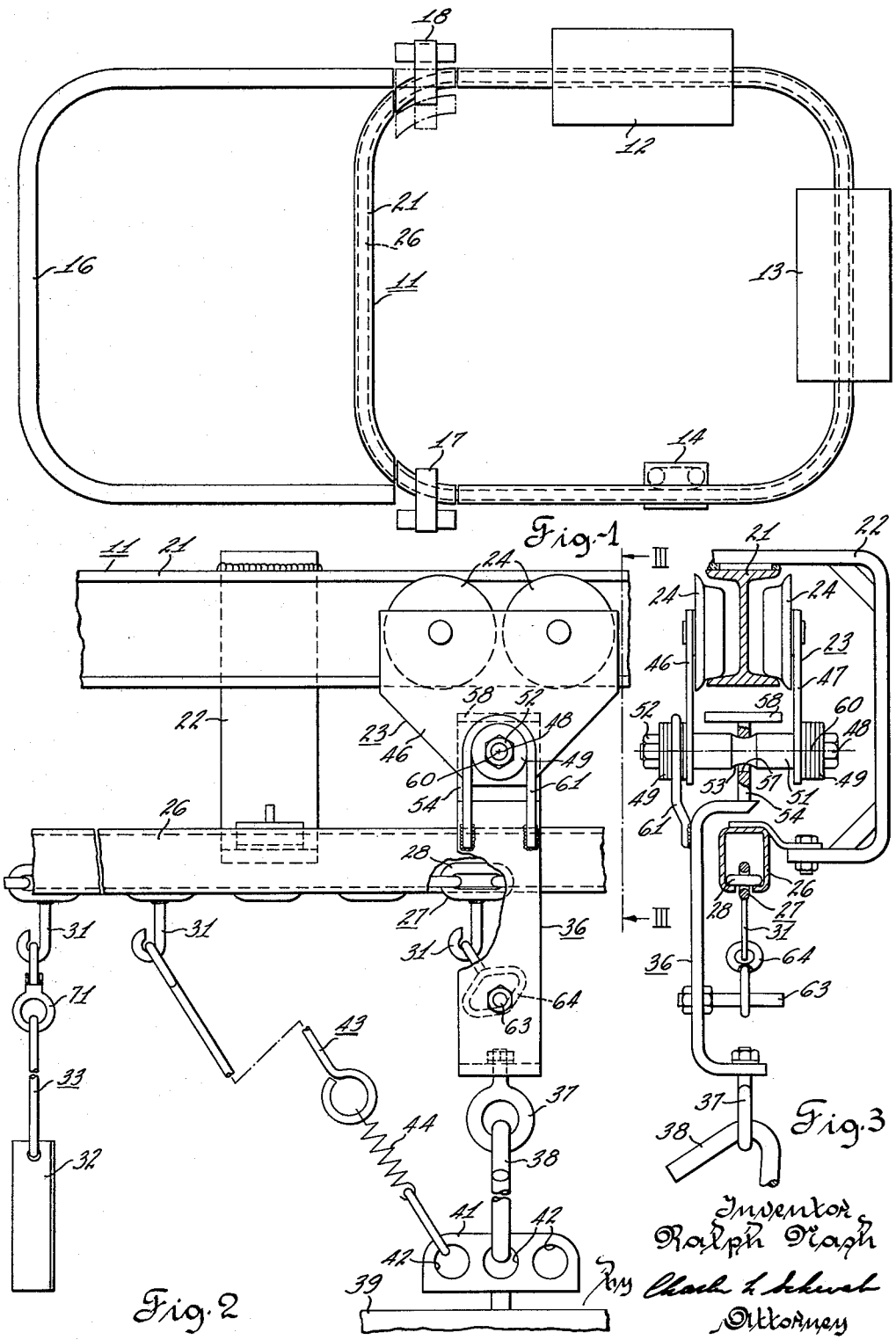

This invention relates to conveyer systems and particularly to a novel combination conveyer system.

Heretofore chain type conveyer means have been utilized to convey light articles and heretofore rail and trolley systems have been utilized as conveyers for heavy articles. It is also well known in the art to provide suitable endless link belt driving means for moving the trolleys along their track system. The desire to increase efficiency and manufacturing capacity of existing plant facilities without alteration of major components such as paint booths and washing booths presented a problem which this invention solves in an extremely novel manner.

It is an object of this invention to provide a dual conveyer system having low space requirements, high conveying capacity, and flexibility in manner of use.

It is a further object of this invention to provide a combination conveyer system employing a rail and trolley conveyer above an endless chain conveyer which may be installed in place of a single conveyor without major alteration of facilities.

It is a further objection of this invention to provide a combination conveyer system wherein the rail and trolleys of a first conveyer are disposed above a chain conveyer and the trolleys are selectively connectable in driven relation with the chain conveyer.

It is a further object of this invention to provide a combination conveyer system wherein heavy articles are transported on a rail and trolley conveyer and light weight articles are conveyed by an endless chain conveyer disposed beneath the rail and trolleys and the chain conveyer drives the trolleys of the rail and trolley conveyer.

It is a further object of this invention to provide the system of the foregoing object which transports heavy and light articles in the same path and which can be installed to pass through conditioning apparatus provided with space for only a signle conventional conveyer system.

These and other objects of this invention will be apparent from the following description when read in conjunction with the drawings in which:

FIG. 1 is a schematic top view of a conveyer system in which my invention is incorporated;

FIG. 2 is a side view of a part of my combination conveyer system;

FIG. 3 is a view taken along the line III—III in FIG. 2.

The overhead view in FIG. 1 shows a conveyer system having a dual conveyer main line 11 which passes through an automatic washer unit 12 and a paint spray booth 13 and a single conveyer branch line 16. The trolleys traveling on the track 21 of the main line 11 may be moved onto branch line 16 upon movement of switch mechanism 17 and trolleys may be moved from the branch line 16 onto the main line 11 by moving switch mechanism 18. The branch line 16 has a track which is of the same section as track 21. Referring particularly to FIGS. 2 and 3, the main line 11 includes a trolley supporting track 21, which may take the form of a rolled section of I or H beam, which is rigidly secured to the top of a plurality of C-shaped brackets 22 spaced along the length of the track. Each of the trolleys 23 includes four flanged wheels 24 which are supported on and guided by the track 21. The bottom of the C-shaped brackets 22 carry guide means in the form of a tube 26 which is disposed beneath and parallel to the track 21. The bottom of the tube 26 is slotted in a conventional manner and an endless chain 28 is positioned within the tube. The chain is power driven in a conventional manner by a power means 14, schematically shown in FIG. 1. As clearly shown in FIG. 3, the chain conveyer 27 is located directly below and in the vertical central plane of the trolley conveyer track 21.

A plurality of depending support elements in the form of hooks 31 are secured as by welding to upstanding links of the chain 28. Some of these hooks are employed to support light weight articles such as sheet metal article 32, through suitable supporting linkage 33. Other hooks 31 are employed as will hereinafter be explained. A C-shaped load supporting hanger 36 is pivotally supported at its upper end on the trolley 23 at a point directly above and vertically aligned with the chain 28 and track 21. The lower end portion of the hanger 36 is adapted to support a relatively heavy article. Specifically, an eye bolt 37 is fastened to the bottom end of the hanger 36 thus permitting hooks 38 or the like to be connected thereto. As illustrated, the hook 38 supports a heavy article 39 through a carrier 41 including a plurality of openings 42, one of which may be utilized for connection to a stabilizing linkage 43 connected at its upper end to one of the hooks 31. Stabilizing linkage is used to prevent rotation and longitudinal swinging of the heavy article. The stabilizing linkage 43 includes a suitable coil spring 44 to provide a yieldable linkage.

The trolley 23 includes a pair of parallel spaced side plates 46, 47 which rotatably carry the wheels 24 and which are rigidly secured in spaced relation to one another by a bolt 48 which passes through thick washers 49 and an intermediate cylinder 51. A conventional nut 52 is secured to one end of the bolt 48. The cylindrical member 51 has a central annular recess 53 for receiving the upper end of the hanger 36. The hanger 36 includes a vertically upstanding portion 54 having a hole 57 big enough for the cylinder 51 to pass through. The connection between the hanger portion 54 and cylinder 51 permits the hanger 36 to swing laterally and about a transverse horizontal axis 60 which is the axis of the bolt 48, cylinder 51 and washers 49. A cross bar 58 is welded to the upper end of portion 54 to limit lateral movement of the upper end of the hanger 36 relative to the trolley 23. A bent rod loop 61 is welded to the hanger 36 and tends to stabilize the hanger 36 against lateral swinging movement in a counterclockwise direction as shown in FIG. 3, without interfering with swinging movement about axis 60. As illustrated in FIGS. 2 and 3 a laterally extending pin 63 is provided in the draft portion of the hanger 36 which is registrable with an eye of double eye length 64 connected to a hook 31 serving as a trolley driving member.

OPERATION

Referring to FIG. 1 light weight articles, for instance, may be fabricated adjacent that portion of the main track 11 between the driving means 14 and the switch 18. The light weight items such as sheet metal part 32 may be connected to hooks 31 leaving empty some hooks for use as driving members for the trolleys 23. Or as illustrated in FIG. 2, the light weight article may be hooked onto a double eye link 71 which is of slightly different construction from the double eye link 64 employed. The work area adjacent the branch 16, which utilizes a track of the same construction as track 21, may be utilized to fabricate and/or assemble heavy components or subassemblies. When a trolley is loaded the switch 18 is shifted to permit the trolley to be moved on to the main track at which time the hanger 36 is swung laterally (clockwise as viewed in FIG. 3) so that the pin 63 may be brought into registration with the eye of draft link 64. The hanger 36 is allowed to swing laterally into its normal position wherein the pin 63 is brought into draft engagement with the link 64. The stabilizing link 61 quickly dampens any lateral swinging that may have been induced by the coupling operation.

The trolleys 23 supporting large (heavy) articles and the chain 28 supporting small (light) articles pass in piggyback fashion through the washer unit 12 and paint booth 13, requiring no additional space. This selective mixing of articles affords considerable flexibility in the manufacturing operation and permits greater utilization of the facilities, thus improving manufacturing efficiency and productivity.

The embodiments of the invention for which an exclusive property or privilege is claimed are defined as follows:

1. In a conveyer system the combination comprising:
   a track,
   a trolley supported on and guided by said track for movement therealong,
   an endless chain conveyer having a section disposed directly below and parallel to said track including guide means and
      an endless chain supported on and guided by said guide means including
         a plurality of depending support elements spaced therealong adapted to support relatively light weight articles releasably connected thereto, and
         a plurality of depending trolley driving members spaced therealong, and
   a hanger connected in depending relation to said trolley having a lower end portion beneath said endless chain conveyer adapted to support relatively heavy articles and a draft portion selectively and releasably engageable in draft relation with said trolley driving members.

2. The structure set forth in claim 1 and further comprising pivot means connecting the upper end of said hanger to said trolley at a point between said track and guide means for lateral swinging movement and wherein said draft portion of said hanger is selectively engageable with and disengageable from said driving members upon said hanger being swung laterally about said pivot means.

3. The structure set forth in claim 2 wherein said pivot means also permits pivotal swinging of said hanger about a horizontal axis transverse to said track and further comprising means tending to stabilize said hanger against lateral swinging movement.

4. The structure set forth in claim 2 wherein said draft portion includes a laterally extending pin and each of said driving members includes an eye registrable with said pin.

References Cited by the Examiner
UNITED STATES PATENTS 2,816,643  12/1957  Klamp _____ 198—177

SAMUEL F. COLEMAN, *Primary Examiner.*